(12) United States Patent
Fukura et al.

(10) Patent No.: US 7,428,802 B2
(45) Date of Patent: Sep. 30, 2008

(54) FIXING/ADJUSTING TOOL OF PLATE MATERIAL

(75) Inventors: Masaomi Fukura, Osaka (JP); Shinichi Okamoto, Osaka (JP); Yoichi Hamanishi, Osaka (JP)

(73) Assignee: Konishi Co., Ltd., Osaka (JP)

( * ) Notice: Subject to any disclaimer, the term of this patent is extended or adjusted under 35 U.S.C. 154(b) by 791 days.

(21) Appl. No.: 10/491,629

(22) PCT Filed: Oct. 1, 2002

(86) PCT No.: PCT/JP02/10222

§ 371 (c)(1),
(2), (4) Date: Apr. 2, 2004

(87) PCT Pub. No.: WO03/031749

PCT Pub. Date: Apr. 17, 2003

(65) Prior Publication Data

US 2004/0244319 A1    Dec. 9, 2004

(30) Foreign Application Priority Data

Oct. 4, 2001    (JP)    ............... 2001-308163

(51) Int. Cl.
E04B 2/82 (2006.01)
E04B 1/00 (2006.01)
E04B 1/61 (2006.01)
E04B 2/00 (2006.01)
E04B 5/00 (2006.01)
E04B 9/00 (2006.01)
E04C 1/00 (2006.01)
E04D 35/00 (2006.01)
E04G 1/22 (2006.01)
E04G 21/14 (2006.01)

(52) U.S. Cl. .................. 52/506.05; 52/126.1; 52/127.1; 52/127.7; 52/309.1; 52/426

(58) Field of Classification Search ................ 52/126.1, 52/127.1, 127.7, 309.1, 426, 428, 459, 479, 52/506.05, 783.1
See application file for complete search history.

(56) References Cited

U.S. PATENT DOCUMENTS

| | | | | |
|---|---|---|---|---|
| 3,523,552 A | * | 8/1970 | Ogden | 137/592 |
| 4,241,553 A | * | 12/1980 | Reicherts et al. | 52/309.5 |
| 4,598,519 A | * | 7/1986 | Reid | 52/426 |
| 5,479,745 A | * | 1/1996 | Kawai et al. | 52/126.6 |
| 5,772,356 A | * | 6/1998 | Collins | 403/343 |
| 6,298,633 B1 | * | 10/2001 | McCorkle et al. | 52/787.1 |

FOREIGN PATENT DOCUMENTS

| | | |
|---|---|---|
| JP | 02-256762 A1 | 10/1990 |
| JP | 06-173414 A1 | 6/1994 |
| JP | 07-292932 A1 | 11/1995 |
| JP | 07-300972 A1 | 11/1995 |

OTHER PUBLICATIONS

International Search Report for PCT/JP02/10222 mailed on Nov. 19, 2002.

* cited by examiner

*Primary Examiner*—Brian Glessner
*Assistant Examiner*—Branon C Painter
(74) *Attorney, Agent, or Firm*—Cheng Law Group PLLC

(57) ABSTRACT

For the fixing adjusting tools of the plate material to the structural body, the female member has a base plate with a through hole in a center and an external cylinder fixed vertically on the base plate. The male member has a base plate with a through hole in a center and an internal cylinder fixed vertically on the base plate. The communicating section is formed in the base of the female member communicating with the gap. The guide cylinder is formed protruding on the base plate of the male member to guide the nozzle for injecting adhesive. Resultantly, the adhesive injected through the guide cylinder into the rear surface of the base plate of the female member, reach the gap between the internal and external cylinders passing the communicating section.

10 Claims, 4 Drawing Sheets

FIXING/ADJUSTING TOOL OF PLATE MATERIAL

FIELD OF THE ART

This invention relates to a fixing/adjusting tool for use between a plate material and a structural body with the fixing/adjusting tool having a female member and a male member in which the female and male members are fitted to each other in an adjustable length, the female and male members are glued either to the structural body or the plate material respectively, and the female and male members being set in the adjusted length are connected together by an adhesive. This tool is used for fixing decorative laminates or interior wood sheathings to the surface of ceilings and walls etc.

BACKGROUND ART

A method of fixing a plate material is disclosed in Japanese Unexamined Patent Publication No. 1973-2932. Such a method was often used to fix the plate material or a board in which a dumpling-like adhesive containing water was applied to a mounting surface and a distance or space between the board and the surface was adjusted by pressing the board.

However, since this method was pointed out to be conducive to the mold growth due to a large amount of water contained in the adhesive, a fixing/adjusting tool of the Japanese Unexamined Patent Publication No. 1995-300972 was proposed in which the space adjustment is possible with a small amount of the adhesive being required.

This tool comprises a member having a basal plate provided with a tube made of thermoplastic resin with an inlet for receiving an adhesive, and a member having a basal plate provided with a rod made of thermoplastic resin with continuous grooves on its surface, wherein the outer diameter of the rod is larger than the inner diameter of the tube. One member is fixed to a structural body, and another member is glued to a board, and the rod is forcefully inserted into the tube, and then the adhesive is injected through the inlet to set the adjusted clearance between the board and the structural body, thereby fixing the board to the structural body.

However, in this composition, to adjust the clearance between the board and the structural body after inserting the rod forcefully into the pipe, much labor is necessary for pushing and pulling work for clearance adjustment.

Further, during the fixing and adjusting the board, the adhesive must be injected between the tube and the rod through the inlet using the groove of the stick body after adjusting of the position of members. Accordingly, the size of the board is limited to be as large as the degree that the adhesive can be injected into the tool from the side edge. Therefore, it has disadvantage of not usable for gluing many tools to a large board.

This invention is directed to provide a fixing/adjusting tool for use between a plate material and a structural body with the fixing/adjusting tool having a female member and a male member in which the female and male members are fitted to each other in an adjustable length, the female and male members are glued either to the structural body or the plate material, and the female and male members being set in the adjusted length are connected together by an adhesive, wherein the adhesive is previously injected into the female and male members before fixing both the male and female members to the board and structural member, which enables adjustment of the clearance between the board and the structural body.

DISCLOSURE OF INVENTION

A first aspect of the present invention to solve the above mentioned problem comprises (a) the female member having a base plate with a through hole in a center and an external cylinder fixed vertically to the base plate, and the male member having a base plate with a through hole in a center and an internal cylinder formed vertically to the base plate. (b) A size of an inner diameter of the external cylinder is arranged to form a gap between an inner wall of the external cylinder and an outer wall of the internal cylinder. (c) Either member of the above male and female members has a communicating section formed in its base plate to communicate with the gap formed between the internal and external cylinders and a rear surface of its base plate, and an attaching area formed at an outer periphery of the communicating section at the rear surface of the base plate. (d) Another member has a guide cylinder to guide a nozzle for injecting the adhesive formed on its base plate that protrudes and continues from the through hole. (e) The front edge of the guide cylinder joins an opening edge of the through hole of one member in a contracted condition of the internal and external cylinders. (f) The adhesive injected through the guide cylinder into the rear surface of the base of one member glued either to the structural body or the board, reaches the gap between the internal and external cylinders through the communicating section.

A second aspect of the present invention comprises, (g) the female member having the base plate with the through hole in the center and the external cylinder fixed vertically to the base plate, and the male member having the base plate with the through hole in the center and the internal cylinder formed vertically to the base plate. (h) The size of the inner diameter of the external cylinder forms a gap between the inner wall of the external cylinder and the outer wall of the internal cylinder. (i) Either one of the members has a guide cylinder to guide the nozzle for injecting the adhesive formed on its base plate with the nozzle protruding and continuing from the through hole, (j) a communicating section formed in its base plate to communicate the gap formed between internal and external cylinders and the rear surface of a flange and an attaching area formed at the outer periphery of the rear surface of the communicating section. (k) The adhesive injected through the guide cylinder into the rear surface of the base plate of one member glued to either the structural body or the board, reaches the gap between the internal cylinder and external cylinder through the communicating section.

A third aspect of the present invention is to modify the composition of the rear surface of the base plate of one member described in the first and the second aspects. A dish-shaped concave part has a larger diameter than the periphery of the inner cylinder formed on the rear surface of the base plate of one member corresponding to the inner periphery of the internal cylinder. The communicating section that communicates with the concave part and the gap between the internal and external cylinders is formed on the base plate of one member.

A fourth aspect of the present invention has projections provided on a front edge of the inside wall of the external cylinder and on a front edge of the outside wall of the internal cylinder so that the respective projections can engage with each other. A fifth aspect of the present invention has the internal and the external cylinders having circular cross section. A sixth aspect of the present invention has the small hole formed on base plate side of the internal cylinder for air release.

This invention employs a composition that an upright internal cylinder on the base plate of the male member is fitted to an upright external cylinder on the base plate of the female member forming a gap between the respective walls of the internal and the external cylinders.

Whichever one of the female member and the male members may be glued to a structural body (building frame) or a plate material (board), the communicating section is formed on the base plate of member that is glued first either to the structural body or plate material. Further the communicating section is formed at the location corresponding to the gap that is formed between the internal and external cylinders so as to connect the rear surface of the base plate with the gap. The outer periphery of the communicating section at the rear surface of the base plate is used as the attaching area. The member is glued to the structural body or plate material by using two-sided tape or an adhesive to the attaching area. Resultantly, in a central area of the rear surface of the base, a space with a thickness of the tape or the adhesive is formed between the base plate and the structural body or the plate material.

In the base plate of the other member, the guide cylinder to guide the nozzle for injecting the adhesive connected to the through hole is formed protruding and continuing from the through hole. In the contracted condition of the internal and external cylinders, since the front edge of the guide cylinder meets the opening edge of the through hole of the base plate of the other member glued previously to the structural body or the plate material, water tightness is roughly kept between the front end of the guide cylinder and the through hole.

After one member is glued to the structural body or the plate material and the other member is fitted to one member with the internal cylinder and the external cylinder in the contracted condition, the adhesive is injected through the nozzle using the guide cylinder. This injected adhesive approaches the rear surface of the base plate of one member passing the through hole and further reaches the gap between the internal and the external cylinder walls passing the space and the communicating section formed in the central part of the rear surface of the glued member. As the adhesive, thixotropic gelatinous agents or mayonnaise like agents are used. It is preferable to use such an agent as to be somewhat elastic after being hardened to provide a cushioning function to the fixing/adjusting tool.

The preparation for the attaching plate material is completed, by pulling out the other member. In this stage, either of the work that is the application of the adhesive or the attachment of a two-side tape to the base plate of another member, or both of the work must be completed.

The two-sided tape is used for temporal tacking of boards while in the fixing work. The adhesive placed at the rear side of the base accomplishes the permanent fixing. For the temporal tacking of plate material, instantaneous adhesives can be used in place of the two-side tape.

In the case that the fixing/adjusting tool is first glued to the structural body, the positions of base plates of one members glued to the structural body are out of alignment due to the irregularity of the structural body. And when the plate material is moved forward in an upright position, bases of other members sequentially attach and glued to the plate material corresponding to the projected positions of the structural body. By further moving the plate material forward to the desired position, base plates of other members are pushed and moved to the applied position corresponding to the position of the plate material. When the movement of the plate material is halted in the condition with a desired distance from plate material and the structural body, the movement of the base plates also stops. In this condition, the adhesive charged in the gap between the internal and external cylinders is kept and adheres to the cylinder walls. The hardening of the adhesive fixes the internal and the external cylinders with settling the distance. The fixing and adjusting of the plate material to the structural body become complete.

As well, the plate material may be pushed strongly to the structural body once, in order to secure the bonding of the base plate to the plate material and drawn back for adjusting the position.

In the case that the fixing/adjusting tool is first glued to the plate material, the base plates of one member glued to the plate material are positioned in about equal height. And when the plate material to which the fixing/adjusting tools are applied is moved toward the structural body in its upright position, the base plates of other members adhere to the structural body according to the irregularity of the structural body. By moving the plate material forward to the desired position, the base plates of one member are pushed corresponding to the applied positions and stop at the position where the desired distance is kept. In this case also, the plate material can be pushed once strongly to the structural body in order to secure adhesion of the base to the plate material and be drawn back for adjusting the position.

In the second aspect, a guide cylinder to guide the nozzle for inletting adhesive is formed protruding on the base of the member applied first to the structural body or the plate material communicating with the through hole. In this aspect, since the adhesive is directly injected into the rear surface of the base plate of one member, the sealing between the guide cylinder and the through hole is not a problem contrary to the above described means.

The size of the through hole of the other base plate can be as large as possible in order to pass the nozzle to the guide cylinder for inserting it. Although there is a possibility of the other base plate to float due to the pressure of injected adhesive, it can be prevented by employing the injection work such as pressing down the opening edge of the through hole with the side wall of the nozzle or as pressing down the base by hand of the worker. Injection of the adhesive is not affected by the through hole not being connected to the upper edge of the guide cylinder.

The fixing procedure of plate materials to structural body is substantially the same as described above.

In the first and the second aspects, the forming of a dish-shaped concave part has a diameter larger than the periphery of the internal cylinder on the rear surface of member which is glued first to the structural body or the plate material, and the forming of a communicating section which connects the concave part with the gap between the internal and the external cylinders, allows the space between the rear surface of the base plate and the area of plate material or structural body to be made thicker than the thickness of the layer of the adhesive and the tape. It enables smooth shift of the adhesive approaching from the rear surface to the gap between the internal and external cylinders.

The engaging projections protruding from the inner wall of the front edge of the external cylinder and from the outer wall of the front edge of the internal cylinder enables both respective projections to engage with each other in the longest state or length of the tool in retrieving one of the member from the other member. It prevents the members from splitting each other, which also prevents the departing of the internal and the external cylinders thereby allowing smooth fixing work.

In the case that the cross section of the internal and external cylinders is shaped into circular form, it is possible to incline the base plates in the condition of the internal and external cylinders being fitted. Therefore, gluing members to the inclined plane formed by irregularity of the structural body does not interfere with the plane of plate material. Further, in this type of the tool, when the layer of the structural body and the plate material are displaced due to vibration such as an earthquake, the internal and external cylinders somewhat rotates following the displacement of the layer.

In addition, the providing of a through hole on the base plate side of the internal cylinder of the male member allows air to go in and out of the member smoothly when the members are moved relatively.

In the contracted condition of the fitted internal and external cylinders, leakage of the adhesive that passed the communicating section to the gap can be prevented by previously fitting the front edge of the cylinder wall to the other applied base plate.

Furthermore, in order to allow the injected adhesive to move smoothly into the gap between the internal and external cylinders, it is useful to provide air release holes on the wall or on the base plate of the internal and external cylinders at the upper side (injected base plate side) of the gap. These holes have merit in that the users can indicate the completion of the charging to the gap by verifying the leakage of the adhesive through these holes. In this case, it is more useful to form at least the base plate of the member with a transparent material. Resultantly, it enables visually tracking the charging condition of adhesive.

As well in this case, the clearances in the adhesive tape and the adhesive agents enable use of the clearances as air release holes when the members are moved relatively.

The communicating sections formed on the base plates are formed corresponding to the gaps between the internal and external cylinders, and these sections are formed at regular intervals. It allows adhesive to move into the gaps at about equal speed.

The formation of concave grooves on any one or both of the outer surface of the internal cylinder and the inner surface of the external cylinder, prevents discontinuity of the adhesive and achieves a secure fixing of both cylinders when the internal and external cylinders are pushed and drawn accompanying the movement of the adhesive in the condition that the gap is filled with adhesive. This concave groove can be formed in a helical, lengthwise direction, a lateral direction, or in combination of them.

Since this fixing/adjusting tool enables fixing of the structural body and the plate material together by applying the tool to the surfaces, injecting the adhesive, and moving or drawing the members, with adjusting the length or distance of both surfaces with having adhesive injected previously, high efficiency of the work is provided. And furthermore, it has a merit to provide light work even in the case that large boards may need to be fixed to structural body or many fixing/adjusting tools may be used.

Also, it has a merit to prevent mold because of a small amount of adhesive agents being required.

BEST MODE FOR CARRYING OUT THE INVENTION

Figure 1:
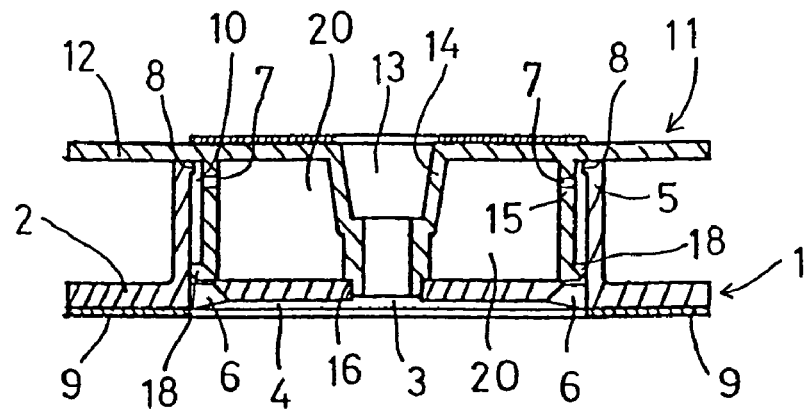
FIG. 1 is a central cross sectional view of the fixing/adjusting tool of this invention in the condition that the male and female members are fitted to each other.
Figure 2:
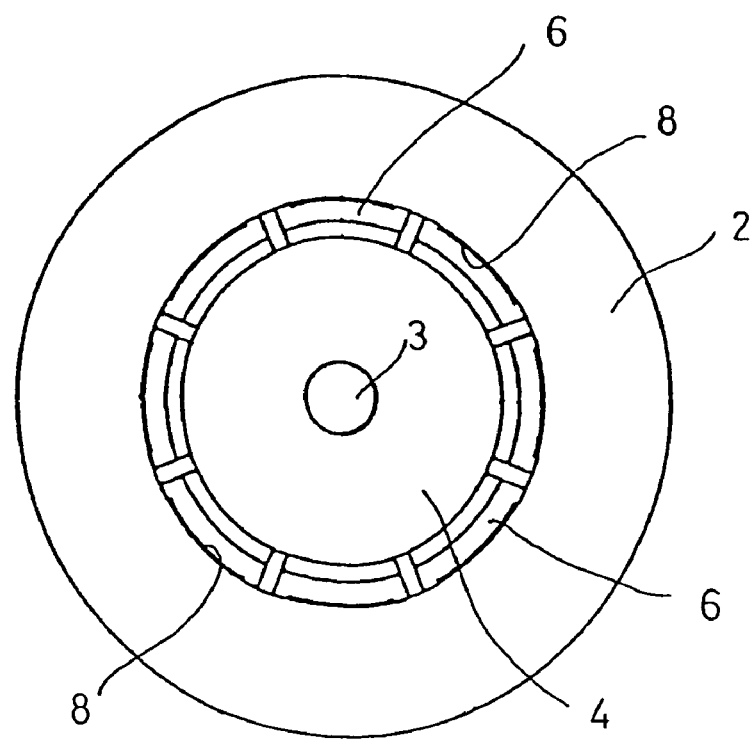
FIG. 2 is a bottom view of the female member of this invention.
Figure 3:
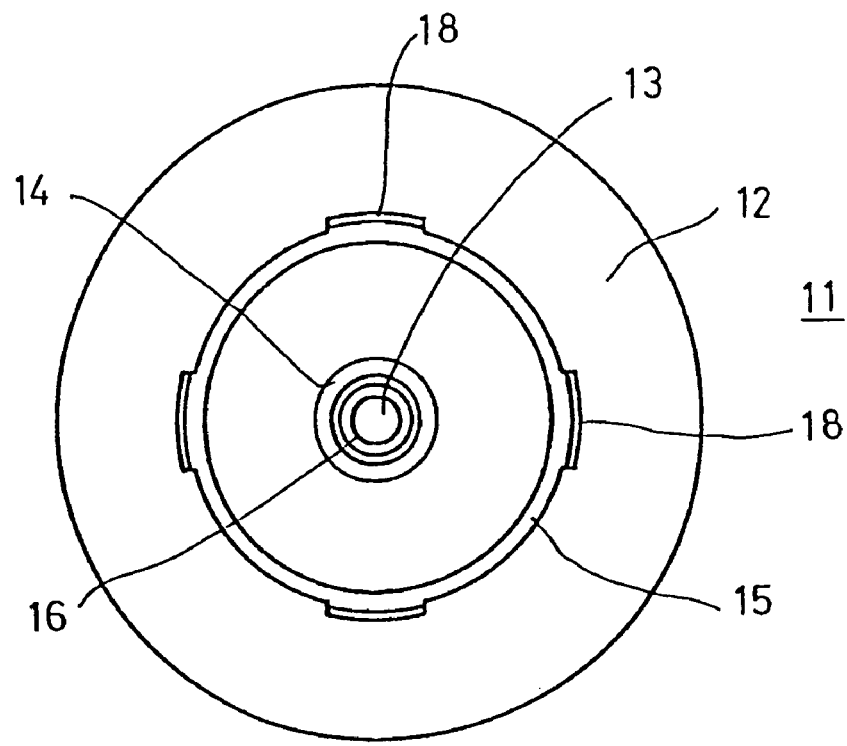
FIG. 3 is a bottom view of the male member of this invention.

FIG. 1~3 show the embodiments related to the first aspects of the present invention. FIG. 1 is a central cross sectional view in the condition where the male and female members are fitted to each other. FIG. 2 is a bottom view of the female member. FIG. 3 is a bottom view of the male member.

The female member 1 and male member 11 are both made of ABS resin. However, they may be made of other resins such as acrylate resin, epoxy resin, and polyester resin etc.

In this embodiment, the female member 1 comprises an external cylinder 5 of a circular cross section having an inner diameter of 49 mm and a height of 15 mm stands upright on a front surface of a base 2 whose diameter is 80 mm. The male member 11 comprises an internal cylinder 15 of a circular cross section having an outer diameter of 46 mm and a height of 15 mm stands upright on a rear surface of a base 12 whose diameter is 80 mm. Accordingly, the fitting of the internal and external cylinders 15, 5 forms a gap 10 with a width of 1.5 mm between the walls of the internal and external cylinders. These dimensions are designed taking the size, weight, and strength of the board to be fixed into account.

A through hole 3 for the injection of an adhesive described later is provided in the center of the base plate 2 of the female member 1, and a dish-shaped concave part 4 centered on the through hole 3 is formed in a rear surface of the base plate. An outer periphery of the concave part forms the base of the external cylinder. In an inside of the outer periphery of the concave part 4, grooves 6, 6 as communicating sections are intermittently provided on the base plate to communicate with the gap 10.

FIG. 1 shows a condition in which a two-side tape 9 is applied to the outer side of the concave part 4, where the tape is not shown in FIG. 2. In the condition that the member 1 is attached to building frames and boards which are not shown in the figure, a space whose depth is the sum of the depths of the concave part 4 and the thickness of the tape 9 is formed between the base plate and the building frame or the board.

A through hole 13 is provided in the center of the base 12 of the male member 11. A guide cylinder 14 to insert the injection nozzle of adhesive not shown in the figure is provided continuously in its rear surface. The base of the guide cylinder 14 is formed tapered to guide the nozzle in the insertion of the nozzle and to allow the guide wall to press down the male member 11 in the injection of adhesive.

In a front edge of the guide cylinder 14, a step 16 is formed, of which a front edge is thinned to allow the front edge of the guide cylinder 14 to approach an inside of the through hole 3 and the step 16 to press down an opening edge of the through hole 3 to keep the water-tight condition. In place of the step, a tapered wall can be employed.

The projections 8, 8 located at an inside of an upper end of the external cylinder 5 and the projections 18, 18 located at an outside of a lower end of the internal cylinder 15 are formed. Each projection prevents the splitting of the cylinders by engaging with each other when the fitted internal and external cylinders 5, 15 are drawn apart.

In this embodiment, the inside of the upper end of the projection 8 and the outside of the lower end of the projection

18, 18 are formed as tapered wall to ease the fitting. The projections 8, 18 our formed four each and circumferentially, but the number of the projections and their intervals are designed appropriately corresponding to the size of the members. The projections may be formed like a ring.

In the base plate side of the internal cylinder 15, small holes 7, 7 for air release are provided to allow the smooth injection of the adhesive and the smooth movement of air in a cavity 20 and air outside in accordance with the movement of the male member 11.

Figure 4:
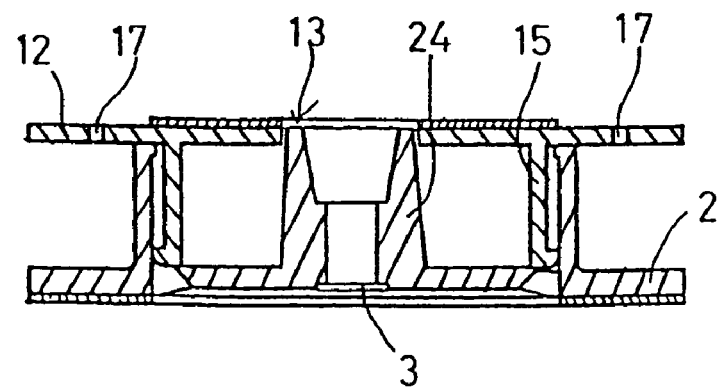
FIG. 4 is a central cross sectional view of the other embodiment of fixing/adjusting tool of this invention in the condition that the male and female members are fitted to each other.
Figure 5:
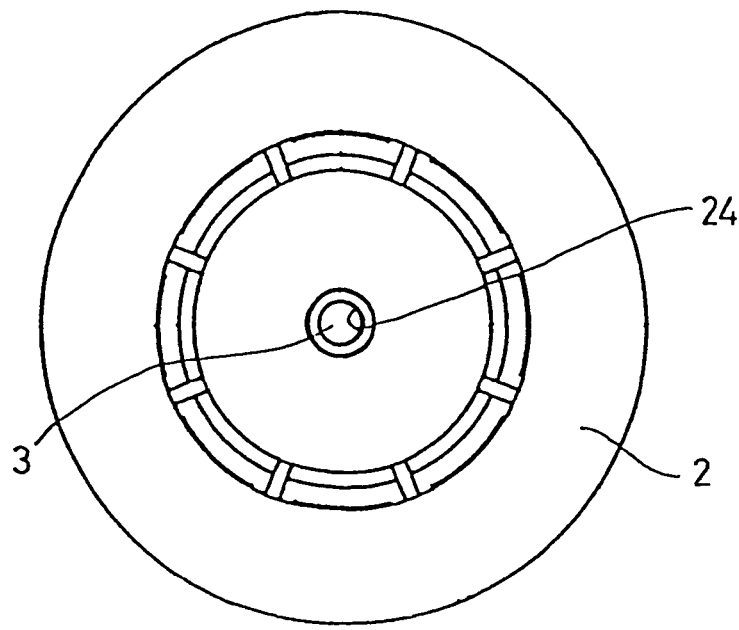
FIG. 5 is a bottom view of the female member of this invention shown in FIG. 4.
Figure 6:
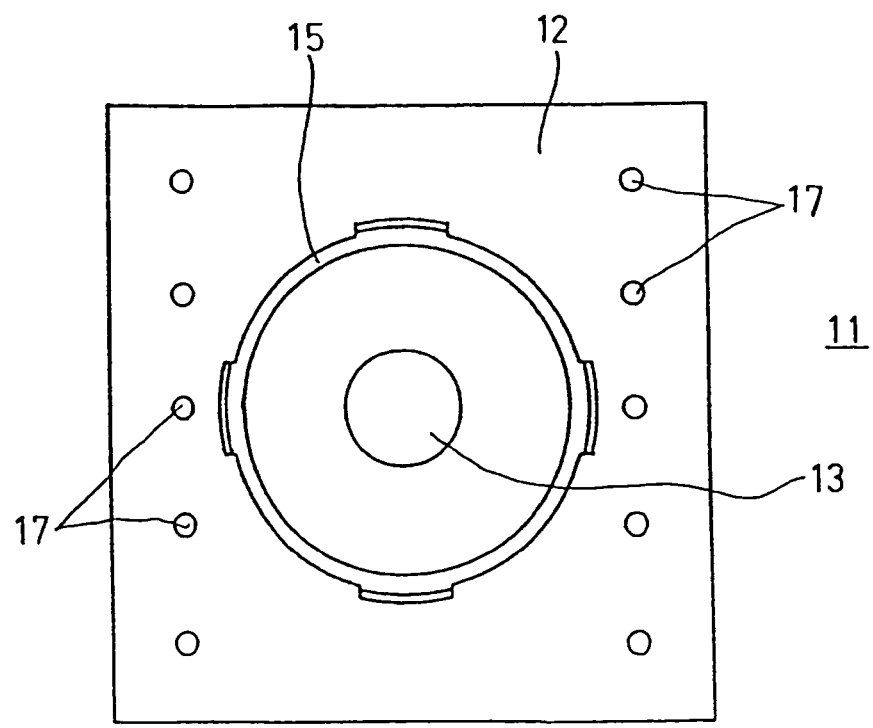
FIG. 6 is a bottom view of the male member of this invention shown in FIG. 4.
Figure 7:
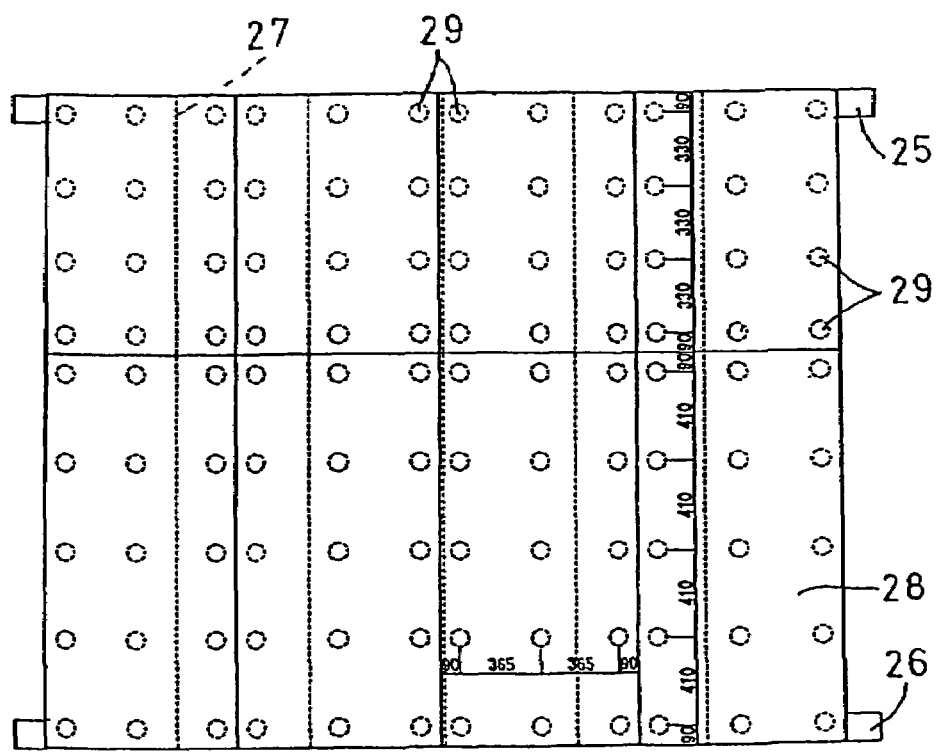
FIG. 7 is a fixed state diagram of the boards in the displacement test of layers.

FIG. 4~6 show the embodiments corresponding to the second aspect of the present invention. FIG. 4 is a central cross sectional view of the female and male members fitted to each other. FIG. 5 is a bottom view of the female member. FIG. 6 is a bottom view of the male member.

This embodiment differs from the above describe embodiment in that the guide cylinder 24 is provided on the female member 1 and that the base plate of the male member is shaped in a square.

The guide cylinder 24 is protrudes from the surface of the base plate 2 and continues from the through hole 3, and the upper end of the guide cylinder faces to the inside of the through hole 13 provided on the center of the base plate of the male member 11 in order to inject adhesive directly from there. To prevent floatage of the base plate 12 during the injection of adhesive, a collar can be provided on the adhesive injection nozzle, by pressing down on the base plate.

Since the inter space surrounded by the guide cylinder 24, the internal cylinder 15, the flange 2, and the flange 15 is not hermetically sealed, there will be no resistance when drawing out the male member 11 after the injection of the adhesive.

On the base 12 of the male member 11, the small holes 17, 17 are provided along an edge. When the adhesive is applied to the surface of the base plate 12 along the edge in order to attach the male member 11 to building frames or boards, the adhesive reaches the rear side passing through the holes 17 at the stage of the male member 11 being pressed against the building frames or boards achieving the anchor action by itself and improving the adhesiveness.

Next, a rotation performance test for the case of the layer between the board and the building frame been displaced is described, in which the boards are fixed to the building frames using the fixing/adjusting tools shown in FIGS. 1~3.

(Body Under Test)

Plasterboards 28 were fixed to ALC boards (Autoclaved Light-weight Concrete panel) 27 using the fixing/adjusting tool 29.

Six ALC boards of the size of W600 mm×H299 mm×t100 mm were arranged in a line longwise, and were fixed to the upper and lower virtual frames 25,26 by pin joint having the mechanism which rotates with the displacement of the layer between virtual frames to form a virtual building frame.

Four plaster boards of thickness 12.5 mm×width 910 mm having length of 1820 mm were arranged in line for the lower stage of the frame, and four of those having length of 1170 mm were arranged in line for the upper stage of the frame.

The fixing/adjusting tool 29 was made by ABS resin and was attached to the ALC plate 27 and to the board 28 by thixotropic silicone adhesive. The numerals in the figure show the intervals of the fixing/adjusting tools, wherein their units are in millimeters.

(Test Procedure)

A test was carried out based on the item 6.19 (Deformation performance test of assembled non-bearing panels by in-plane shearing-bending) of JIS A 1414 "Methods of performance test of panels for building construction". A large in-plane shearing test device was used. A horizontal force was applied to the lower frame side by a hydraulic servo actuator to increase the static displacement of the layer of the test body against the height of the virtual frame was gradually increased according to the cycle shown in Table 1. The sign [+] in Table 1 shows rightward, and the sign [−] shows leftward.

TABLE 1

| Cycle | In-plane deformation angle(rad) | Observation |
|---|---|---|
| (1) | 0 → +1/400 → 0 → −1/400 → 0 | Normal |
| (2) | 0 → +1/300 → 0 → −1/300 → 0 | Normal |
| (3) | 0 → +1/200 → 0 → −1/200 → 0 | Joint displacement |
| (4) | 0 → +1/150 → 0 → −1/150 → 0 | Peeling sound of the board surface paper |
| (5) | 0 → +1/120 → 0 → −1/120 → 0 | Same as above |
| (6) | 0 → +1/100 → 0 → −1/100 → 0 | Same as above |
| (7) | 0 → +1/60 → 0 → −1/60 → 0 | No change |

(Test Results)

To the final cycle of the static loading test, although the partial peeling off of the board surface papers to which the fixing/adjusting tools were applied was observed, no falling off of the boards and the fixing/adjusting tools nor pushing out or floating of the boards out of the surface was observed.

The ALC boards followed the deformation of the layer between virtual frames by rotation, and from the results described above, it was verified that with the rotation of the ALC plate, the plasterboards also rotated using the relative rotation between the members of the fixing/adjusting tools following the ALC boards.

What is claimed is:

1. A fixing/adjusting tool for use between a plate material and a structural body, comprising:

a female member and a male member, the female and male members being fitted to each other in an adjustable length, the female and male members being glued either to the structural body or the plate material respectively, the female and male members being set in the adjusted length and connected together by an adhesive, wherein the female member has a female member base plate with a female member through hole formed in a center thereof and an external cylinder fixed vertically to the female member base plate;

the male member has a male member base plate with a male member through hole formed in a center thereof and an internal cylinder fixed vertically to the male member base plate;

the external cylinder having an inner wall defining the circumference of said external cylinder and sized to have an inner diameter, the internal cylinder having an outer wall defining the circumference of said internal cylinder, the outer wall disposed within the circumference of said external cylinder defined by said inner wall, the inner wall of the external cylinder and the outer wall of the internal cylinder forming a gap therebetween;

one of the female member or the male member has a communicating section formed in its respective base plate to communicate with the gap formed between the internal and external cylinders and a rear surface of its respective base plate and an attaching area formed at an outer periphery of the communicating section at the rear surface of its respective base plate;

a remaining one of the female member or the male member has a guide cylinder to guide a nozzle for injecting the adhesive, the guide cylinder being formed on its base plate and protruding and continuing from the through hole;

a front edge of the guide cylinder joins an opening edge of the through hole of one member in a contracted condition of the internal and the external cylinders; and the adhesive injected through the guide cylinder into the rear surface of the base plate of one member which is attached either to the structural body or the plate material, reaches the gap between the internal cylinder and external cylinder through the communicating section.

2. A fixing/adjusting tool for use between a plate material and a structural body according to claim 1, wherein a dish-shaped concave part having larger diameter than an inner cylinder periphery of the inner cylinder is formed on the rear surface of the base plate of one member corresponding to an internal cylinder periphery of the internal cylinder, and the communicating section that communicates the concave part and the gap between the internal and external cylinders is formed on the base plate of the one member.

3. A fixing/adjusting tool for use between a plate material and a structural body according to claim 1, wherein projections are provided on a front edge of the inner wall of the external cylinder and on a front edge of the outer wall of the internal cylinder to engage with each other.

4. A fixing/adjusting tool for use between a plate material and a structural body according to claim 1, wherein a cross section of the internal cylinder and the external cylinder is a circle.

5. A fixing/adjusting tool for use between a plate material and a structural body according to claim 1, wherein a small hole is formed on a base plate side of the internal cylinder.

6. A fixing/adjusting tool for use between a plate material and a structural body comprising:

a female member and a male member, the female and male members being fitted to each other in an adjustable length, the female and male members being glued either to the structural body or the plate material, the female and male members being set in the adjusted length and connected together by an adhesive, wherein the female member has a female member base plate with a female member through hole formed in a center thereof and an external cylinder fixed vertically to the female base plate;

the male member has a male member base plate with a male member through hole formed in a center thereof and an internal cylinder fixed vertically to the male member base plate;

the external cylinder having an inner wall defining the circumference of said external cylinder and sized to have an inner diameter, the internal cylinder having an outer wall defining the circumference of said internal cylinder, the outer wall disposed within the circumference of said external cylinder defined by said inner wall, the inner wall of the external cylinder and the outer wall of the internal cylinder forming a gap therebetween;

one of the female member or the male member has a guide cylinder to guide a nozzle for injecting the adhesive, the guide cylinder being formed on its base plate and protruding and continuing from the respective through hole, and a communicating section formed in its respective base plate to communicate with the gap formed between the internal and external cylinders and a rear surface of its respective base plate, and an attaching area formed at an outer periphery of the communicating section at the rear surface of its respective base plate; and the adhesive injected through the guide cylinder into the rear surface of the base plate of the one member which is attached either to the structural body or the plate material, reaches the gap between the internal and external cylinders through the communicating section.

7. A fixing/adjusting tool for use between a plate material and a structural body according to claim 6, wherein a dish-shaped concave part having larger diameter than an inner cylinder periphery of the inner cylinder is formed on the rear surface of the base plate of one member corresponding to an internal cylinder periphery of the internal cylinder, and the communicating section that communicates the concave part and the gap between the internal and external cylinders is formed on the base plate of the one member.

8. A fixing/adjusting tool for use between a plate material and a structural body according to claim 6, wherein projections are provided on a front edge of the inner wall of the external cylinder and on a front edge of the outer wall of the internal cylinder to engage with each other.

9. A fixing/adjusting tool for use between a plate material and a structural body according to claim 6, wherein a cross section of the internal cylinder and the external cylinder is a circle.

10. A fixing/adjusting tool for use between a plate material and a structural body according to claim 6, wherein a small hole is formed on a base plate side of the internal cylinder.

* * * * *